(12) United States Patent
Bonner et al.

(10) Patent No.: US 7,715,698 B2
(45) Date of Patent: May 11, 2010

(54) CONTROL ELECTRONICS FOR BRUSHLESS MOTORS

(75) Inventors: David Bonner, Bethlehem, PA (US); Aidong Xu, Cambridge (GB)

(73) Assignee: Thor Power Corporation, Bethlehem, PA (US)

( * ) Notice: Subject to any disclaimer, the term of this patent is extended or adjusted under 35 U.S.C. 154(b) by 333 days.

(21) Appl. No.: 11/469,023

(22) Filed: Aug. 31, 2006

(65) Prior Publication Data

US 2007/0132410 A1      Jun. 14, 2007

Related U.S. Application Data

(60) Provisional application No. 60/712,945, filed on Aug. 31, 2005, provisional application No. 60/725,775, filed on Oct. 11, 2005.

(51) Int. Cl.
*H02P 7/06* (2006.01)

(52) U.S. Cl. ............. 388/804; 318/400.01; 318/400.02; 318/700

(58) Field of Classification Search ............ 318/400.01, 318/811, 17, 400.04, 400.09, 700, 400.02; 388/804
See application file for complete search history.

(56) References Cited

U.S. PATENT DOCUMENTS

| | | | |
|---|---|---|---|
| 6,060,859 A | 5/2000 | Jonokuchi | 318/801 |
| 6,320,286 B1 * | 11/2001 | Ramarathnam | 310/50 |
| 6,392,372 B1 * | 5/2002 | Mays, II | 318/400.01 |
| 6,528,966 B2 * | 3/2003 | Na | 318/727 |
| 6,545,438 B1 * | 4/2003 | Mays, II | 318/400.01 |
| 6,566,764 B2 * | 5/2003 | Rebsdorf et al. | 290/44 |
| 6,844,699 B2 * | 1/2005 | Arimitsu et al. | 318/801 |
| 7,248,006 B2 * | 7/2007 | Bailey et al. | 318/400.4 |
| 7,489,856 B2 | 2/2009 | Haller | 388/827 |

FOREIGN PATENT DOCUMENTS

| | | |
|---|---|---|
| WO | WO 02/077739 A1 | 10/2002 |
| WO | WO 03/084047 A1 | 10/2003 |

OTHER PUBLICATIONS

International Rectifier, "High Performance Sensorless Motion Control IC", Sep. 15, 2003, 57 pgs.

* cited by examiner

*Primary Examiner*—Rita Leykin
(74) *Attorney, Agent, or Firm*—Robert M. Bauer; MacDonald, Illig, Jones & Britton LLP

(57) ABSTRACT

An electronic control circuit controls a brushless DC motor. It includes an input power supply control circuit. A microcontroller integrated circuit has control functions to control a brushless DC motor. Additional control functions are provided by software program instructions, which when executed, cause the microcontroller integrated circuit to perform additional control functions for the brushless DC motor.

3 Claims, 4 Drawing Sheets

CONTROL ELECTRONICS FOR BRUSHLESS MOTORS

RELATED APPLICATIONS

This application claims priority to U.S. Provisional Patent Application Ser. No. 60/712,945, filed Aug. 31, 2005 and to U.S. Provisional Patent Application Ser. No. 60/725,775, filed Oct. 11, 2005. The contents of both provisional applications are hereby incorporated by reference in their entirety.

FIELD OF THE INVENTION

The invention relates generally to power electronics. In particular, the invention relates to control electronics for brushless motors.

BACKGROUND OF THE INVENTION

The US Department of Energy estimates that alternating current motors consume more than 65% of the electricity produced today and total electricity sales in the US will increase at an average annual rate of 1.9%, from 3,481 billion kilowatt hours in 2001 to 5,220 billion kilowatt hours in 2025. With a reduction in electrical energy consumption by 33%, by today's measure, is equivalent to the total output of 840 fossil fuel-based power plants. Throughout the world, electricity is used at an average rate of 40 billion kilowatt-hours each day, with a projected average annual growth rate of 2.3% for the next 20 years.

With few exceptions, much of the electricity is not used in the form in which it was initially produced. Rather, it is reprocessed to provide the type of power needed in the technology that is being employed. Power electronics convert electrical power from one form to another. By the end of this decade, it is expected that up to 80% of electrical power will be processed by power electronics equipment and systems.

To control a brushless direct current (BLDC) motor, it is critical to know the rotor position. One known method is to fit Hall Effect Sensors inside the motor to detect the rotor position. This method has the disadvantage of fitting the hall sensors (including components and assembly costs). Sensorless control methods do not have this disadvantage. There are at least two different types of sensorless control methods: 1) detecting the back-emf zero crossing; and 2) space vector control (or field oriented control).

The back-emf zero crossing detecting method is more suitable for motors with trapezoidal back-emf. The noise margin at zero crossing for this type of motor is relatively large since the zero crossing is sharp as shown in FIG. 4.

But for BLAC (Sinusoidal back-emf) motor, the zero crossing is more gradual, therefore noise margin at zero crossing is much smaller as shown in FIG. 5. The space vector control method on the other hand is ideally suited for BLDC with sinusoidal back emf. It consists of controlling the components of the motor stator currents, represented by a vector, in a rotating reference frame d,q aligned with the rotor flux. It requires the dynamic model equations of the motor and returns the instantaneous currents and voltages in order to calculate and control the variables. So-called Clarke and Park transformation will take place to translate the stator variables (currents and angle) into a flux model. This flux model is compared with the reference values and updated by a PI controller. After a back transformation from field to stator coordinates, the output voltage will be impressed to the machine with Pulse Width Modulation (PWM).

BRIEF SUMMARY OF THE INVENTION

The preferred embodiments provide improved electric efficiency compared to conventional alternating current motor systems. The application of the preferred embodiments are almost limitless, as alternating current motors are used extensively, world-wide, today in many products and applications, including air conditioners, refrigerators, power tools, washers, and dryers, and industrial power tools, such as angle grinders, to name a few. The preferred embodiments use new electronic motor control circuitry, which may be combined with highly efficient rare-earth magnetic, brushless direct current (BLDC) motors, to electronically regulate the motor.

Some embodiments may accept all major international voltages, eliminating the need for having different control electronics and motors for many different countries. These embodiments may be applied to motor systems up to 5 kilowatts, but have particular application to the 1 to 2 kilowatt power range.

The important aspects are connecting a host including software program instructions to a microcontroller integrated circuit. When the software program instructions are executed, the host dynamically controls parameters of vector control algorithms embedded in the microcontroller integrated circuit. Other aspects are:

Adapt a controller IC to the challenging high power, high speed, and high performance motor application. While the controller IC may have many control functions built-in, design customization in software sets the application specific control parameters and, through both power electronics hardware and the control algorithm development, is able to achieve a maximum 30,000 rpm motor speed at 2 kW load and upto 4 kW overload capability.

Soft start is implemented to allow the motor smooth start-up.

Implement a vector control method so that the motor has much smooth torque profile.

Implement a PFC circuit design that is highly compact (smaller choke and power semiconductor devices and high efficiency). This is achieved through: a) very low Rds(on) MOSFETs (but still commercially viable); b) state-of-art Silicon Carbine Diode (SIC Diode) for zero reverse recovery current; c) higher switching frequency (over 60 kHz), even under 110V supply, over 50 A current; and d) high switching frequency enabling much reduced choke size.

An inverter uses an IGBT IPM module with specific thermal substrate and package design. Through motor control algorithm, full advantage is taken of the IGBT characteristics, and the inverter achieves very compact design and high efficiency.

Other aspects include comprehensive control software for motor specific applications: e.g. motor start-up; under various load condition; overload capability and protection and thermal protection—all these are achieved with a very low cost PIC processor.

BRIEF DESCRIPTION OF THE DRAWINGS

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

The preferred embodiments are directed to control electronics for brushless dc motors. The major building blocks are described below. Where specifics are provided, such as the identification of suitable parts, such specifics are illustrative and exemplary, and need not be utilized in a particular preferred embodiment. While the preferred embodiments have a power rating of about 2 kilowatts, with overload capability, and work with both European (230V AC) and American (110V AC) supply voltages, they may be applied or adapted for motors up to about 5 kilowatts or with different supply voltage capabilities.

Figure 1:
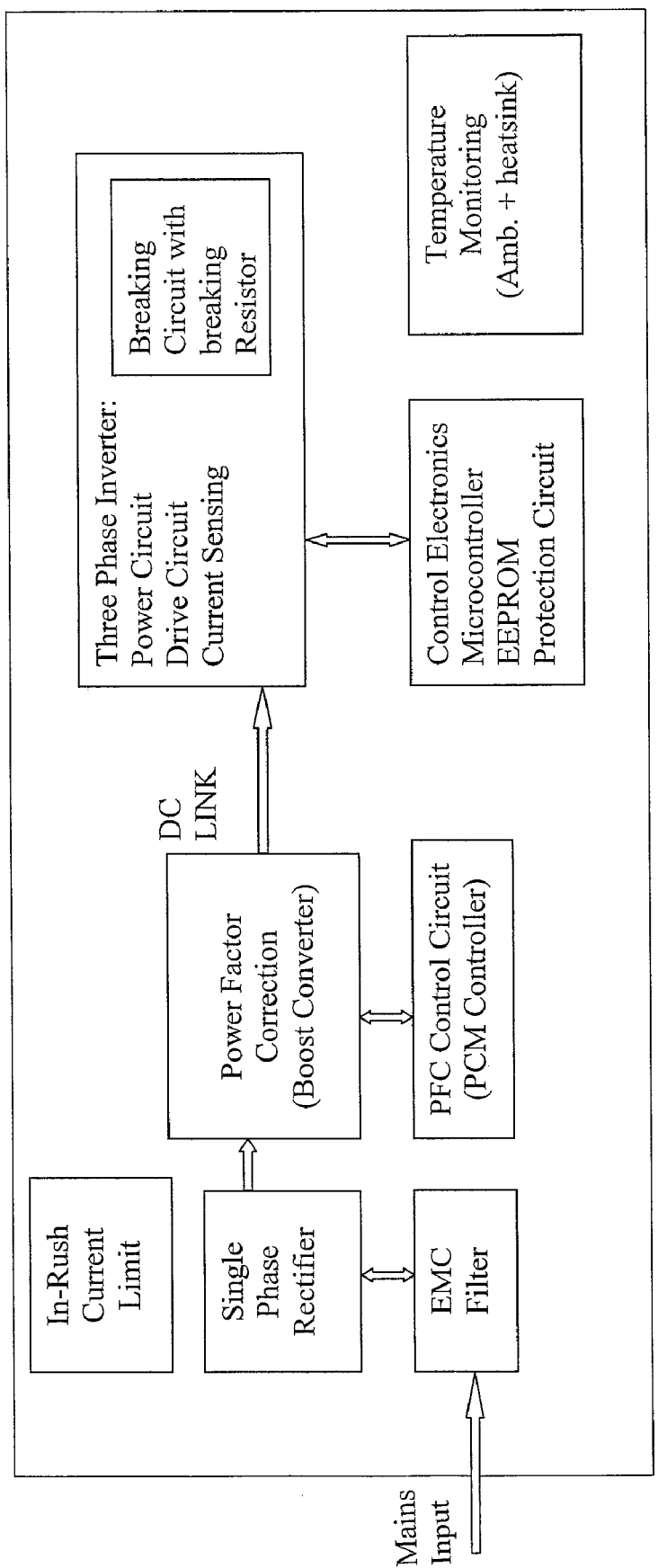
FIG. 1 is a block diagram of the control electronics according to a preferred embodiment of the invention.

A block diagram of the control electronics is shown in FIG. 1. Optimally, the electronics are separated and divided into two parts on a single printed circuit board. On the left side, there is input power control circuitry connected by a DC link to control circuitry on the right side.

Figure 3:
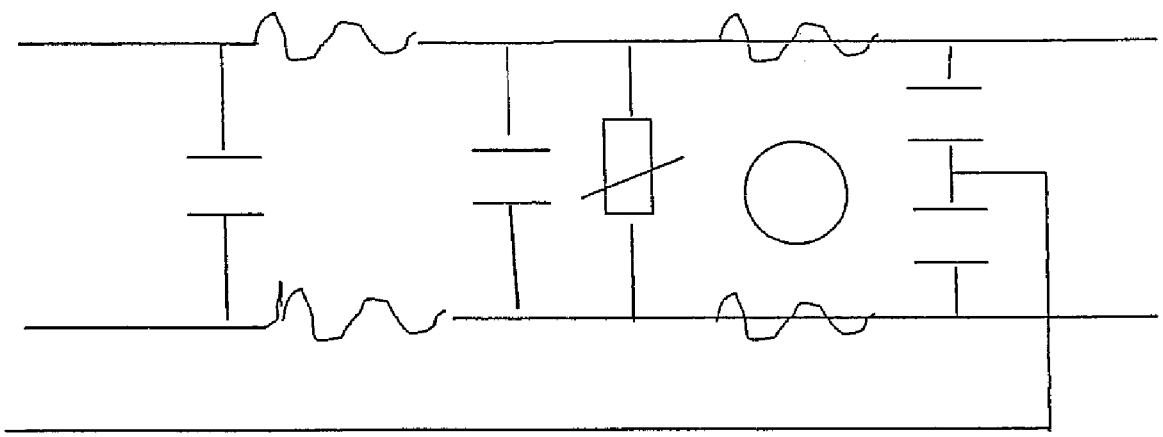
FIG. 3 is a differential mode EMC filter in the embodiment of FIG. 1.
Figure 4:
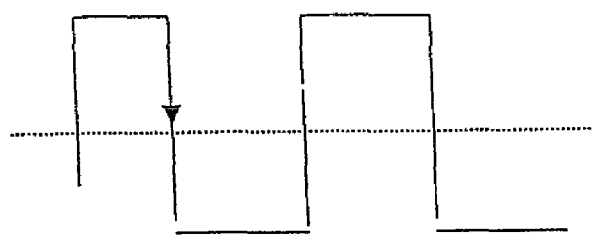
FIG. 4 shows the noise margin for a trapezoidal back-emf motor.
Figure 5:
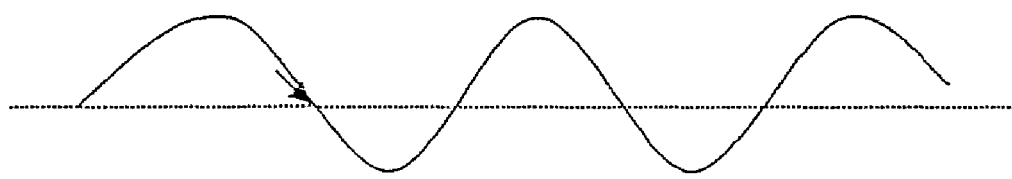
FIG. 5 shows the noise margin for a BLAC (Sinusoidal back-emf) motor.

The input power control circuitry receives the main input and includes an EMC filter, and a single phase rectifier with in-rush current limiter. The input power control circuitry may include the electronics disclosed in U.S. Pat. No. 7,088,066 issued on Aug. 8, 2006, which patent is hereby incorporated by reference in its entirety. The circuitry also includes a power factor correction (PFC) circuit (which may include a boost converter), and a PFC control circuit, such as a PWM controller. The EMC filter may be a common mode and differential mode EMC filter as shown in FIG. 3. The rectifier may be an input diode rectifier bridge used to convert single phase AC to DC. An IR GBPC3512W bridge rectifier (about 0.9V×2), or other rectifiers with a below average forward voltage drop, may be used. The PFC circuit serves two main purposes: power factor correction and step up supply voltage. For inductor in the PFC circuit, the Coolu core is preferably used. As a power switching device, a STW45NM50FD may be used (two in parallel) for their low Rdson (0.08 ohm). Two in parallel will yield 0.04 ohms resistance. A NCP1650-D (Onsemi) is preferably used as the power factor controller, but the UC3845 (or newer 3817A) may also be used.

The control circuitry implements a new space vector control method. In this method, the controllability of the motor torque closely matches the load requirement and may be less affected by back-emf noise. It is also likely that the motor will have less vibration, less torque ripple and better efficiency. This method may be implemented using software algorithms and a Digital Signal Processor (DSP) to carry out complex vector calculation.

An exemplary implementation would be an adaptation of the PM motor IC control module IRMCK203 available from International Rectifier. This hardware device is designed for complete closed loop current and velocity control of a high performance sensorless drive for PM motors. It has many internal registers and an external microcontroller may be programmed to dynamically control parameters of vector control algorithms embedded in the device. A PIC micro may be used as the microcontroller.

A Mitsubishi $5^{th}$ generation IGBT DIM-IPM module (PS21867 or open emitter version PS21067) may be used for the IPM module, although an additional braking IGBT will be required. IR2175 devices from International Rectifier may be used to measure the current at the output line to motor (floating measurement). A very low cost switched mode power supply may provide all the on-board control power supply requirements: 3.3V, 5V, 12V, etc. and isolated supply for external thermistor, start/stop switch, RS232 interface, etc.

Figure 2:
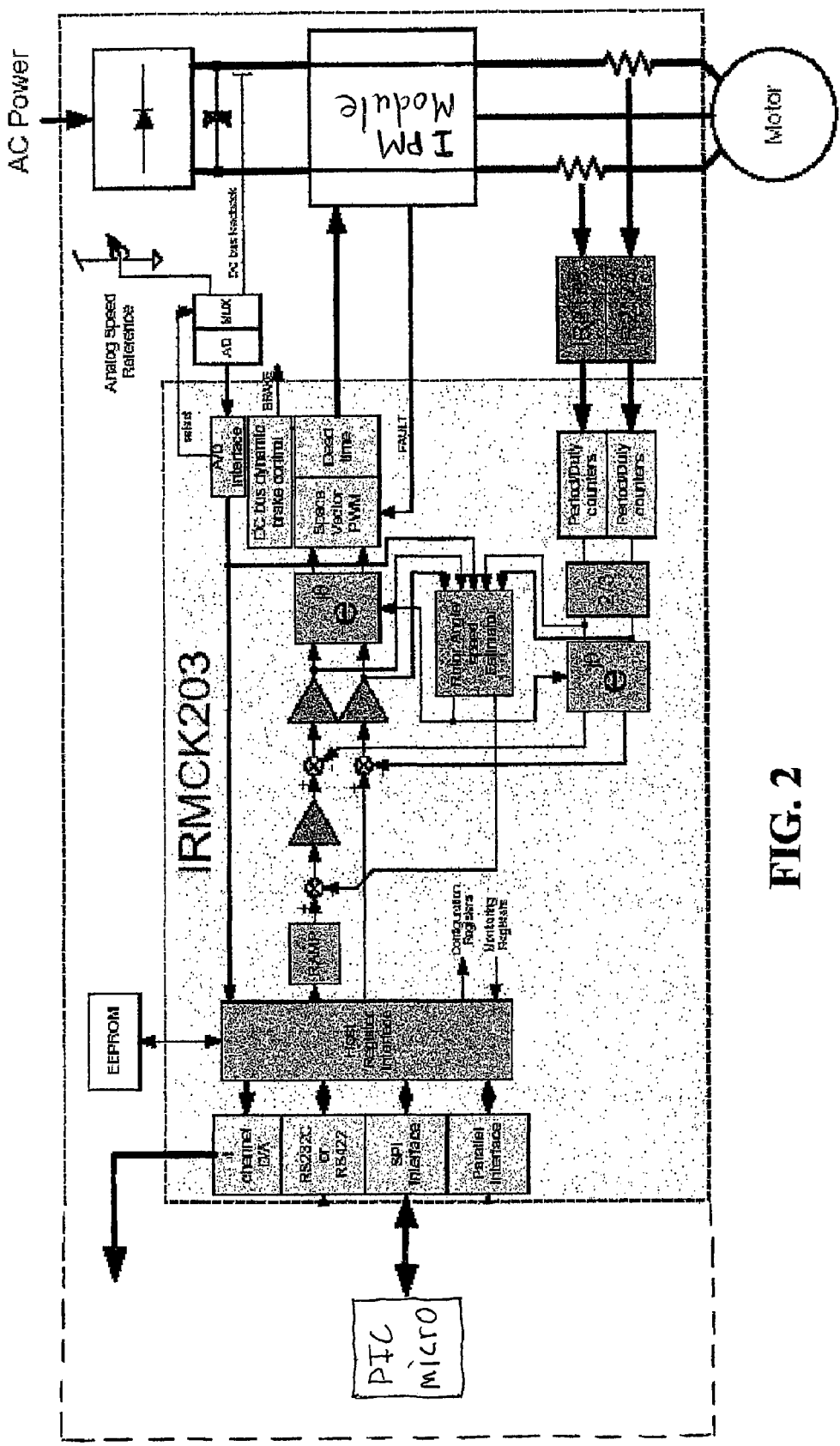
FIG. 2 is a specific implementation according to a preferred embodiment of the above mentioned parts of the invention.

A specific implementation using many of the above mentioned parts is shown in FIG. 2.

What is claimed is:

1. An electronic control circuit for a brushless motor, comprising:
    a power supply circuit;
    a microcontroller integrated circuit having control functions to control a brushless motor; and
    a host, connected to said microcontroller integrated circuit and including software program instructions, said program instructions when executed dynamically controlling parameters of said control functions of said microcontroller integrated circuit,
    wherein said control functions comprise vector control algorithms embedded in said microcontroller integrated circuit.

2. An electronic control circuit according to claim 1, wherein said host dynamically controls parameters of said vector control algorithms.

3. An electronic control circuit according to claim 1, further comprising devices configured to measure the current at an output line from an IPM module to said brushless motor and to provide the measured current as an input to said microcontroller integrated circuit.

* * * * *